United States Patent Office 2,750,916
Patented June 19, 1956

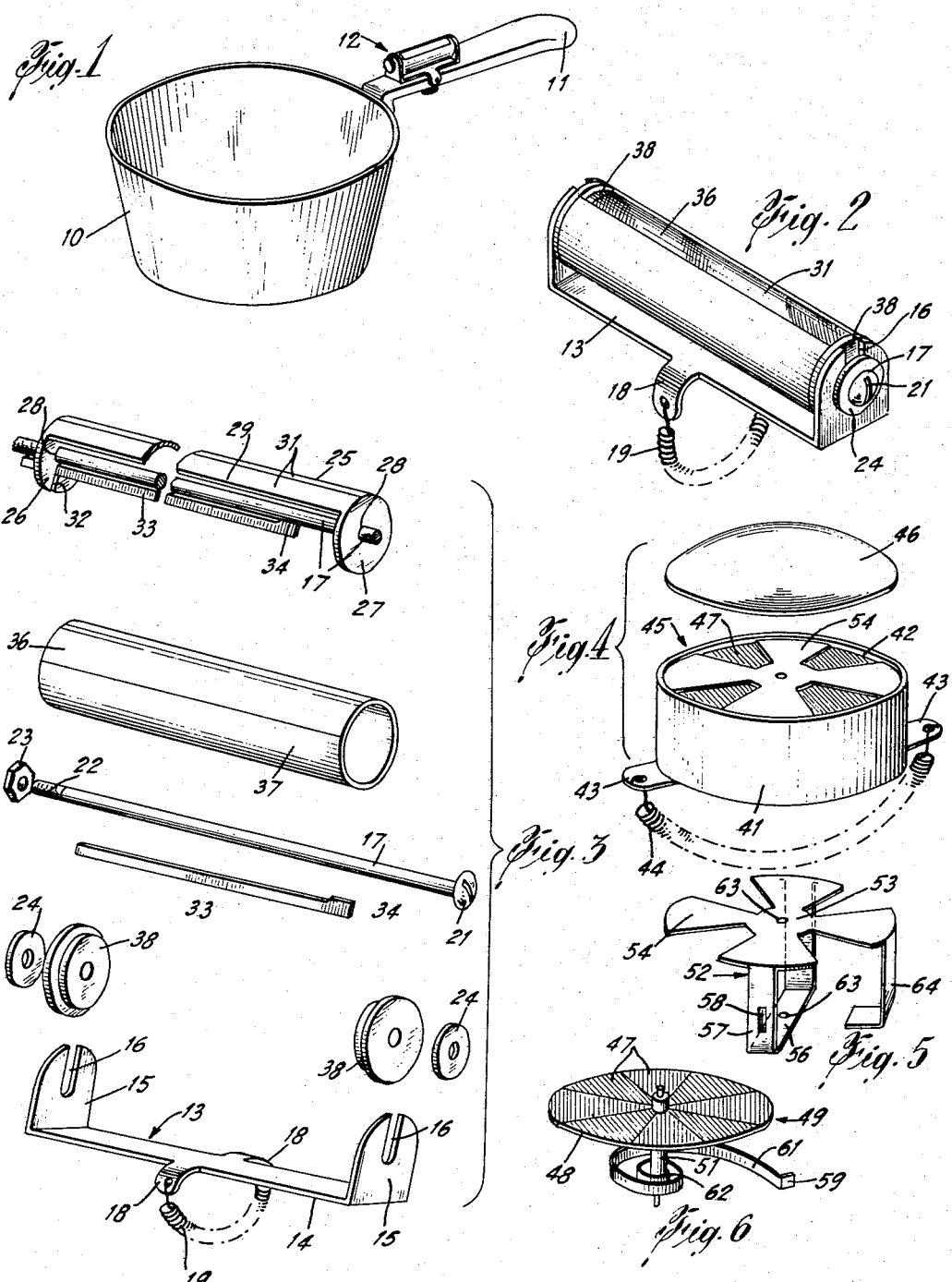
INVENTOR.
CHARLES A. HANINGTON

2,750,916

HEAT INDICATOR FOR POT HANDLES

Charles A. Hanington, Freeport, N. Y.

Application December 7, 1953, Serial No. 396,704

2 Claims. (Cl. 116—102)

This invention relates to an indicator and in particular to one for application to the handle of a cooking utensil.

A particular object of the invention is to visually indicate to the person using a cooking pot whether the temperature of the handle is a safe one so that the vessel can be lifted without danger of burning the bare hand.

A further object of the invention is to provide an indicating device of the character referred to which will tell at a glance, by using contrasting colors, whether the temperature of the handle is safe or unsafe for handling.

Still further objects of the invention are: to provide an indicator that can be detachably supported on the handle or other part of a vessel so that it can be used on different utensils; to make the indicator with a minimum number of parts that can be readily manfactured and easily assembled to produce the device at the lowest cost; to make the indicator in different forms so that it will be attractive in appearance, will have a positive operation; will be sensitive to heat changes and will accurately show when the temperature of the handle of the vessel is beginning to get warm and increasingly hot to provide a warning so that the utensil will not be handled without the use of a protective pot lifter.

With these and other objects in view, the invention comprises certain constructions hereinafter described and then particularly pointed out in the claims and a preferred embodiment of my invention is illustrated in the accompanying drawing in which:

Figure 1 is a view in perspective of a cooking utensil showing the indicator applied to the handle thereof, Figure 2 is an enlarged view in perspective showing one form of the indicator, Figure 3 is an exploded view of the parts of the indicator shown partly assembled and separated, Figure 4 is an enlarged view in perspective of an indicator made in drum shape, the lens thereof being shown in exploded relation to illustrate the parts thereunder, Figure 5 is a view in perspective showing the rotor cage used in the indicator shown in Figure 4, and Figure 6 is a view in perspective showing the rotor housed in the cage shown in Figure 5.

Referring to the drawing in detail, 10 indicates a cooking utensil of any kind providing a handle 11 on which an indicator 12 can be detachably supported. The indicator, as shown particularly in Figures 1, 2 and 3, comprises a mounting frame 13 shaped from suitable strip material to provide a bottom 14 for contact with the handle of the pot to provide a heat transfer medium constituting a base for the indicator. The bottom forming strip is turned upwardly at its ends to provide ears 15 slotted downwardly as at 16 from the upper edges thereof, the bottoms of said slots being axially aligned for the support of a shaft 17 extending therebetween. The bottom is further formed to present side tabs 18 connected by a coil spring 19 through the medium of which the indicator can be slid over pot handles of various shapes and sizes to be removably supported thereon.

The shaft 17 is provided with a slotted head 21 and a threaded terminal 22 carrying an adjusting nut 23 whereby the shaft with suitable washers 24 can be secured in the frame 13. The shaft carries an indicator rotor 25 consisting of spaced end disks 26 and 27 having axially aligned holes 28 through which the rotor can be mounted for easy turning movement on the shaft. The disks are connected by a longitudinally extending strip 29 having contrasting color zones 31 thereon, which for example may be red and green and the disk 26 is radially slotted as at 32 to receive the free end of an actuator strip 33 of bi-metallic material whose opposite end is spot-welded or otherwise attached to the shaft 17. The strip 33 at its area of attachment to the shaft is widened at 34 so that the strip is spaced from the shaft and in parallel relation thereto to provide a radially applied turning force for the rotor as the bi-metal strip is distorted under the influence of heat. The distortion of the strip will turn the rotor so that the red part of the color zone 31 will gradually appear in a slight opening 36 of a tubular casing 37 in which the rotor is housed. The casing is made of heat resistant glass or plastic material and provides the transparent zone or sight opening 36 lengthwise thereof, the rest of the tube being colored to provide an opaque wall for concealing the parts. The rotor is axially aligned with the tube on the shaft 17 which is journalled in flanged centering gaskets 38 which fit into and close the opposite ends of the tube 37.

In the form of indicator illustrated in Figures 4, 5 and 6 the casing 41 is of hollow drum form presenting a top bezel 42 and diametrically opposite tabs 43 for holding a coil spring 44 through the medium of which the indicator denoted generally by the numeral 45, can be detachably secured to the handle of a pot. The top of the casing is closed by a lens 46 which can be snapped into the bezel, and through which lens may be seen the colored zones 47 of the disk 48 of a rotor 49 which includes a spindle 51 mounted for rotary movement in a rotor cage 52. The latter is shaped to provide a cruciform top 53 whose arms 54 are segment shaped to correspond to the shape of the segmental colored zones 47 and to cover alternate zones so that the openings provided between the arms constitute sight openings in which either the green color zones are displayed when the indicator is cold or the red zones are shown when the indicator is hot. The colors gradually change as the heat increases so that the user can judge at a glance when the heat of the handle is too high for the handle to be grasped by the bare hand. The rotor cage is formed to provide a stirrup portion 56 presenting a slotted side portion 57 in the slot 58 of which is held the free end 59 of a rotor actuator bi-metal strip 61 whose opposite end is spot welded or otherwise secured to the spindle 51 as at 62. The rotor cage has axially aligned holes 63 providing bearings for the upper and lower ends of the spindle and one of the arms 54 of the top 53 is provided with a depending leg 64 for attachment to the inside of the casing 41 or for rest on the bottom thereof if a bottom wall is used. The latter is not necessary but might be employed to act as a heat transfer medium. The distortion of the bi-metal strip 61 will turn the spindle and cause the colors to change in the indicator.

It is evident that I have provided an indicator of simple construction that can be produced at sufficiently small cost to enable the user to buy one for each of the cooking vessels used that require handling, and one that will accurately and visually indicate the condition of the handle and provide a safeguard against the user accidently grasping an overheated pot handle with resulting burns to the hand.

It is to be understood that the end 34 need not be widened as a weld spot will serve the same purpose; that use may be made of the distortion of a bi-metal strip, the snap of a Therm-O-Disc or expansion of a piece of metal having a high coefficient of expansion to operate the rotor and that the spring for holding the device on the handle may be replaced by a spring clamp or any means for mounting the device in association with pot lids or other suitable parts of the utensils.

My invention is not to be restricted to the precise details of construction shown since various changes and modifications may be made therein without departing from the scope of the invention or sacrificing the advantages derived from its use.

What I claim is:

1. An indicator of the character described comprising a frame, a shaft fixed in said frame, a rotor loose on said shaft including a radially slotted end member, a heat responsive element secured to said shaft and extending into said slot and operable under distortion to turn the rotor on said shaft, a housing for the rotor having a sight opening, indicating means on the rotor for presentation to the sight opening and means on said frame for detachably mounting said indicator on the handle of a cooking receptacle.

2. An indicator of the character described comprising a frame, a shaft fixed in said frame, a rotor including end disks revolvably mounted on said shaft, and an arcuate longitudinal strip connecting the peripheral edges of said disks said strip presenting on one face a plurality of longitudinally extending colored zones, one of said disks having an opening therein, a heat responsive element attached to said shaft and extending into said disk opening for actuating the rotor, a casing for the rotor, a clear sighting zone in said casing into register with which said colored zones may be brought for observation by movement of the rotor, means for fixedly mounting the casing on said shaft, and means for detachably mounting the indicator on the handle of a cooking receptacle.

References Cited in the file of this patent

UNITED STATES PATENTS

| 995,854 | Ferbrache | June 20, 1911 |
| 1,676,536 | Ferkel | July 10, 1928 |
| 2,254,570 | Hailey | Sept. 2, 1941 |
| 2,660,143 | Simmons | Nov. 24, 1953 |